(12) United States Patent  (10) Patent No.: US 6,722,493 B2
Matsuoka et al.  (45) Date of Patent: Apr. 20, 2004

(54) CONVEYOR ROLLER DRIVE DEVICE AND DRIVE ROLLER ASSEMBLY

(75) Inventors: Hiroki Matsuoka, Nishitokyo (JP); Kazuyoshi Umeda, Ohbu (JP); Kiyoji Minegishi, Aichi (JP); Jun Tamenaga, Ohbu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 69 days.

(21) Appl. No.: 09/955,314

(22) Filed: Sep. 19, 2001

(65) Prior Publication Data

US 2002/0033320 A1 Mar. 21, 2002

(30) Foreign Application Priority Data

Sep. 19, 2000 (JP) ....................... 2000-283560

(51) Int. Cl.$^7$ .............................................. B65G 13/06
(52) U.S. Cl. ..................................................... 198/788
(58) Field of Search ........................... 198/781.04, 788, 198/834, 835

(56) References Cited

U.S. PATENT DOCUMENTS 1,825,119 A * 9/1931 Mug ........................... 198/788
4,275,572 A * 6/1981 Holmes et al. ........ 198/781.04

FOREIGN PATENT DOCUMENTS

JP 11-79358 3/1999

* cited by examiner

Primary Examiner—Joseph E. Valenza
(74) Attorney, Agent, or Firm—Arent Fox Kintner Plotkin & Kahn, PLLC

(57) ABSTRACT

A conveyor roller drive device is provided to mechanically prevent conveyed goods from falling down on a conveyor system. The conveyor roller drive device includes a power generator for generating rotational power and a coupling portion which is coupled to a conveyor roller. A traction roller transmission mechanism is disposed in the rotational power transmission path between the power generator and the coupling portion. The traction roller transmission mechanism includes a sun roller, planetary rollers disposed on the periphery of the sun roller to roll in contact with the sun roller, a ring roller for allowing the planetary rollers to roll in contact with the inner periphery surface of the ring roller, and a carrier being in phase with the revolution component of the planetary rollers. Any one of the sun roller, the ring roller, and the carrier is employed as an input element for receiving rotational power, another one employed as an output element for outputting the rotational power, and the remaining one employed as a fixed element.

7 Claims, 8 Drawing Sheets

CONVEYOR ROLLER DRIVE DEVICE AND DRIVE ROLLER ASSEMBLY

BACKGROUND OF THE INVENTION

1. Field of the Invention

The present invention relates to a conveyor roller drive device for driving the conveyor rollers of a conveyor system by rotational power provided by a power generator. The present invention also relates to a drive roller assembly with the conveyor roller drive device combined with the conveyor rollers.

2. Description of the Related Art

Conventionally, conveyor systems for conveying various goods have been widely used in every aspect of whatever the industrial field.

In general, such a conveyor system includes a plurality of conveyor rollers, and one or more of the conveyor rollers are rotated by means of the conveyor roller drive device. It is to be understood that the combination of the driven conveyor rollers and the conveyor roller drive device is herein referred to as the drive roller assembly.

Incidentally, the concept of the conveyor system includes two types of conveyor systems, one type of system for allowing the conveyor rollers to directly contact with and convey goods, and the other type of system, having a conveyor belt wound around a plurality of conveyor rollers, for allowing the conveyor belt to convey the goods.

In recent years, such a drive roller assembly of motor roller type has been realized which houses a conveyor roller drive device inside the conveyor rollers. Such a configuration allows motor or the like to disappear when viewed from outside. Thus, this makes it possible to provide a more functional design to the system and thereby allows the production line of a factory to look tidy in addition to a reduction in size and weight of the conveyor system.

FIG. 8 illustrates a drive roller assembly 10 of this type. The drive roller assembly 10 functions as a motor roller, in which a conveyor roller drive device 16 (hereinafter referred to as the drive device) is housed inside a cylindrical barrel portion 14 of a conveyor roller 12.

The drive device 16 includes a motor 18 or a type of power generator, a gear reducer 20 provided in the motor 18, and a coupling portion 22, coupled to the barrel portion 14, for transmitting output from the gear reducer 20 to the conveyor roller 12. At the rear side of a casing 24 of the motor 18, a support shaft 24a is provided integrally therewith and fixed to an external member 26 (the overall configuration thereof is not shown; for example, which corresponds to a conveyor frame). Two bearings 28 are provided inside the casing 24 and rotatably support a motor shaft 30.

The gear reducer 20 is a three-stage reduction configuration having first to third simple planetary gear mechanisms 32, 34, 36, in which each of the simple planetary gear mechanisms 32, 34, 36 has a sun gear T, a planetary gear Y, a ring gear R, and a carrier C. In this configuration, all the ring gears R are integrally formed in a gear box 38, a rotational power is input to the sun gear T, and the rotational power is output from the carrier C. The gear box 38 is fixed to the casing 24 of the motor 18.

The sun gear T of the first simple planetary gear mechanism 32 is formed directly on the end portion of the motor shaft 30 and thereby allows the power of the motor 18 to be input. In addition, the carrier C of the third simple planetary gear mechanism 36 is provided with an output shaft 40 of the gear reducer 20. The coupling portion 22 has a cylindrical projection 22b formed at the center of a disc-shaped plate portion 22a. The output shaft 40 is fixedly inserted in the projection 22b, and the periphery of the plate portion 22a is fixed with screws 22c to the barrel portion 14. This configuration allows the power of the motor 18 to be reduced by means of the gear reducer 20 and in turn transmitted to the conveyor roller 12 via the coupling portion 22.

On the outer periphery surface of the projection 22b of the coupling portion 22, there is provided a bearing 41, which holds the output side of the gear box 38.

The barrel portion 14 of the conveyor roller 12 is covered at both the axial ends thereof with circular side discs 42 and 44.

The side disc 42 on one end has a through hole 42a formed at the center thereof, where a bearing 46 is provided and the support shaft 24a of the motor 18 penetrates the through-hole 42a and the bearing 46. Accordingly, the side disc 42 (at one end of the conveyor roller 12) is rotatably supported by means of the support shaft 24a.

Likewise, the side disc 44 on the other end has also a through-hole 44a formed therein, where a bearing 48 is provided. In addition, an independent support shaft 50 or a member separated from the drive device 16 inside the conveyor roller 12 penetrates the through-hole 44a, with the independent support shaft 50 being fixed to the external member 26. Accordingly, the side disc 44 on the other end (of the conveyor roller 12) is rotatably supported by means of the independent support shaft 50.

Inside the support shaft 24a of the motor 18, there is formed a wire guide path through which wiring 52 passes to supply electricity to the motor 18. Since the motor 18 itself is fixed to the external member 26 by means of the support shaft 24a, the reactive force generated upon driving the conveyor roller 12 is received by means of the support shaft 24a.

As described above, it is possible to directly convey goods or drive the conveyor belt by the rotation of the drive roller assembly 10 that serves as a motor roller.

The drive roller assembly 10 and a part thereof or the drive device 16 can positively transmit power by the engagement of gears. Thus, the drive roller assembly 10 and the drive device 16 are provide with a high torque transmission capability, being suitable in particular for conveying heavy goods.

However, recent years have seen various goods as goods to be conveyed, and accordingly the environment in which the goods are to be conveyed and the function with which the conveyor system has to be equipped have varied. Correspondingly, recent years have found such situations which the aforementioned drive roller assembly 10 or the like cannot sufficiently deal with.

It is not always true that conveyed goods are placed on the conveyor system under a stable condition (in the state of a low center of gravity). For example, goods having a high center of gravity such as long bottles or the like are placed upright in some cases. In these cases, when (the absolute value of) an acceleration in the conveyor system was too high, the conveyed goods readily fell down and thereby the conveyor line had to be temporarily stopped. In addition to this, there was a problem that when the line was temporarily stopped with the conveyed goods remaining placed on the conveyor system, the line had to be restarted from a standstill state to a high speed state of operation, thereby causing the conveyed goods to fall down again.

In order to avoid these problems, it is necessary to employ an inverter (a frequency controller) in addition to the drive device 16 so that the line continues to operate at a low speed with a low acceleration during a start-up and then increases gradually in speed to finally come to a constant high speed. However, the inverter is very expensive (approximately the same cost as the drive roller assembly 10), leading to a substantial increase in cost of the whole system.

In general, these are caused by a torque greater at the start-up than during steady operation. For example, the high-efficiency motor or the like, which has become predominant lately in various fields of application, has the start-up torque approximately four times as great as the rated torque. Accordingly, the line would be subjected to a high start-up torque with or without the inverter, often causing the conveyed goods to fall down.

Furthermore, the rotational load of the conveyor would be significantly varied all of a sudden upon placing heavy goods suddenly onto the conveyor system during operation or upon unloading heavy goods from the conveyor at a time. This variation in load, transmitted directly to the drive roller assembly 10, would present a problem that the support shaft 24a for receiving the reactive torque was subject to damage. Furthermore, the variation in load, directly transmitted to the external member 26 (frame) via the support shaft 24a, would cause vibrations or noise to occur from the frame. To avoid the vibrations and noise, the frame had to be increased in rigidity.

As described above, attempts to satisfy the recent market requirements by means of the drive roller assembly 10 would cause increases in cost in all aspects.

Incidentally, it is preferable that an axial length W of the conveyor roller 12 should be made as short as possible to reduce the weight thereof in order to convey thin members. However, as is obvious from FIG. 8, the axial length W could not be made as short as desired due to the restraint of the size of the drive device 16 which is housed inside the conveyor roller.

This is mainly caused by the configuration of support at both ends in which the gear box 38 is extended in the axial direction to provide the bearing 41 therein and support the motor 18 and the gear reducer 20 on the side of the coupling portion 22. This is because it is difficult in terms of strength to support the motor 18 and the gear reducer 20 only by the support shaft 24a in a cantilever fashion. This can be found obvious from the assumption of the absence of the bearing 41. That is, the motor 18 deflects in a cantilever state, thereby making it extremely difficult to maintain the concentricity of the motor shaft 30 and the output shaft 40 (the carrier C).

SUMMARY OF THE INVENTION

The present invention was developed in view of the aforementioned problems. It is therefore the object of the present invention to provide a drive device which can mechanically prevent a sudden acceleration or deceleration and a drive roller assembly which can provide a compact axial length to the conveyor rollers.

To achieve the aforementioned object, the present invention provides a conveyor roller drive device including a power generator for generating rotational power, and a coupling portion, coupled to a conveyor roller of a conveyor system, for transmitting the rotational power of the power generator to the conveyor roller. The conveyor roller drive device is adapted that a traction roller transmission mechanism is disposed in a rotational power transmission path between the power generator and the coupling portion. Here, the traction roller transmission mechanism includes a sun roller, planetary rollers disposed on a periphery of the sun roller to roll in contact with the sun roller, and a ring roller for allowing the planetary rollers to roll in contact with an inner periphery surface of the ring roller.

The inventor considered that the problem such as of the conveyed goods falling down on the conveyor system was hidden in the "positive torque transmission by gear engagement" which would generally be considered to be a merit of the gear. In this structure, the power generator will transmit torque (particularly, a start-up torque and a braking torque) directly to the conveyor rollers, thereby causing conveyed goods to readily fall down upon start-up and breaking. That is, torque is transmitted directly too much, thereby resulting conversely in a demerit.

In this context, according to the present invention, attention has been focused on disposing the traction roller transmission mechanism in the power transmission path of the conveyor roller drive device (hereinafter referred to as a drive device). Unlike the gear engagement, the traction roller transmission mechanism allows power to be transmitted by the traction produced between the rollers, thereby always producing sliding between the input and output elements. In other words, "sliding" serves to transmit power.

FIG. 7 illustrates schematically the relationship between the transmission torque of the traction roller transmission mechanism and the sliding (indicated by solid line A). Application of zero torque to the traction roller transmission mechanism causes no sliding to occur, while the sliding increases continuously (in a curve) as the torque increases and a given limit to transmittable torque (which is referred to as the maximum transmission torque) is then reached. Suppose a high torque is input from either side. In this case, as is obvious from this relationship, the sliding produced by the traction roller causes a difference in rotational speed between the input and output, thereby functioning as a "cushion". Suppose that this happens to the gear transmission structure. In this case, as shown by dotted line B of FIG. 7, with the sliding remaining zero all the time, the input torque is directly transmitted to the output side to give a shock to a counterpart machine. (Here, the "sliding" is meant not to occur on the tooth face but designates a delay in rotational speed between the input and output.)

For example, suppose the conveyor rollers are driven. In this case, when the torque produced by starting up the power generator is transmitted to the conveyor rollers, the traction roller transmission mechanism which is disposed in the power transmission path allows the sliding to function as a "cushion" for the transmission of torque. Accordingly, a sudden rise in drive torque is prevented, thereby making it possible to prevent the conveyed goods from falling down. This happens not only at the time of start-up but also at the time of a sudden acceleration and deceleration.

The present invention is discussed in more detail below. The difference between the start-up torque of the power generator and the load torque of the conveyor roller (which equals the start-up torque minus the load torque) is used as an acceleration torque for accelerating the rotation of the conveyor rollers. With the acceleration torque being too high (i.e., the start-up torque being too high), the rotation of the conveyor rollers is suddenly accelerated, thereby causing the conveyed goods to fall down. However, the present invention allows the traction roller transmission mechanism to slide to act as a "cushion". The conveyor side is not always provided with a predetermined speed (output speed of power generator/acceleration or deceleration ratio). The sliding causes the speed of the conveyor to increase slightly behind an increase in that of the power generator. Thereafter, the amount of sliding of the traction roller transmission mechanism is reduced gradually, finally allowing the conveyor rollers to be shifted to steady operation.

As described above, the cushioning start-up function of the traction roller transmission mechanism creates a difference in time between the power generator side and the conveyor roller side upon transition to the steady state, thereby making it possible to prevent the conveyed goods from falling down.

Conversely, for example, suppose that some external impact is applied to the conveyor system side to result in a variation in load of the conveyor rollers. In this case, the load torque is prevented from being directly transmitted to the power generator side. This is also because the traction roller transmission mechanism functions as a cushion for the transmission of torque. Suppose that a sudden increase in load torque is directly transmitted to the power generator. In this case, as the speed decreases, an increase in torque of the power generator side occurs for a sudden acceleration. Consequently, continuous sudden accelerations and decelerations would cause the conveyed goods to readily fall down. However, the present invention provides the traction roller transmission mechanism. A sudden increase in load torque would thereby allow the sliding to increase and act as a cushion. This allows a drop in speed on the conveyor side to affect not directly but indirectly the power generator side including the (increased) amount of sliding. Accordingly, a sudden variation in torque can be prevented, thereby enabling a comparatively smooth shift (or restoration) to the steady state.

Furthermore, as is obvious from the foregoing results, variations in torque acting upon between the power generator and the conveyor rollers are alleviated. This in turn reduces the vibration to be transmitted to the external frame to which the power generator is fixed Consequently, the burden of the coupling portion between the power generator and the external frame is alleviated. In addition, the rigidity of the external frame needs not to be increased unnecessarily (to prevent vibrations), thereby making it possible to reduce fabrication cost.

Incidentally, an accelerator and decelerator other than the traction roller transmission mechanism can also be incorporated in the power transmission path of the present invention. In other words, it is possible to provide the aforementioned action by disposing at least one traction roller transmission mechanism anywhere in the path.

Furthermore, in the aforementioned invention, it is preferable that a sliding ratio of the traction roller transmission mechanism is set to 0.1% or more and 1.0% or less when a rated torque of the power generator is transmitted to the conveyor roller. With the aforementioned setting, it is possible to allow an offset (a delay) in speed of the conveyor roller side to fall within the aforementioned range during the steady operation of the power generator. Incidentally, the sliding ratio is the difference (the amount of sliding) between the ideal speed (input speed/acceleration or deceleration ratio) and the actual speed of the output element of the traction roller transmission mechanism, the difference being expressed as a percentage to the ideal speed.

It has been already described that the traction roller transmission mechanism has a cushioning function; however, this requires a consideration about the balance between the function and the drive capacity of the conveyor system. Accordingly, in the aforementioned invention, it is preferable that limit transmission torque P of the traction roller transmission mechanism is set so as to satisfy that $P > 1.0 \times T$, with respect to an output element converted value T of the traction roller transmission mechanism corresponding to a load torque provided during the steady operation of the conveyor system. The limit transmission torque is obtained by converting the limit torque transmissible by the traction roller transmission mechanism in terms of the output element. For example, suppose the rotational power is input to the input element and a gradually increasing braking torque is provided such as by braking to the output element side in order to measure the limit transmission torque. In this case, the limit transmission torque means the maximum value of the braking torque obtained during the transition in which the sliding gradually increases up to infinity (where no rotation is available to the output element). As described above, the limit transmission torque exceeds the load torque of the conveyor system in steady operation, thereby making it possible to positively drive the conveyor rollers (only in steady operation).

In the foregoing, the conveyor roller drive device for driving the conveyor roller has been described. When integrated with each other, the conveyor roller drive device and the conveyor roller can be considered to be a "drive roller assembly". In this case, it is preferable that a motor is employed as the power generator, and the motor, the traction roller transmission mechanism, and the coupling portion are housed inside the barrel portion of the conveyor roller, so that the conveyor roller functions as a motor roller.

In this case, it is desirable that the output element of the traction roller transmission mechanism is fixed to the coupling portion, and the fixed element of the traction roller transmission mechanism is fixed to the casing of the motor, thereby allowing the traction roller transmission mechanism to support the output side of the motor.

In the drive roller assembly of this type, the rear side of the motor is fixed to the external member with the support shaft. However, in the prior art, a separate specially-provided shaft was adapted to rotatably support the front side by a coupling portion or the like. This separate shaft made the structure of the drive device complicated and the conveyor roller longer in the axial direction.

This structure allows the output element of the traction roller transmission mechanism to be fixed to the coupling portion (which also means that the output element is integrated with the coupling portion.). That is, the traction roller transmission mechanism is adapted to allow each roller to roll in contact therewith and can function as a bearing, thereby providing a bearing to the coupling portion in this state. Accordingly, with the fixed element of the traction roller transmission mechanism being fixed to the casing of the motor (irrespective of whether directly or indirectly), the front side of the motor is meant to be supported by the bearing (the traction roller transmission mechanism).

Consequently, the need for a separate special-purpose bearing is obviated and thereby the drive device is simplified, leading to a reduction in weight of the device. Furthermore, the conveyor roller can be made shorter in the axial direction, thereby making it possible to flexibly vary the length in a wider range as required.

BRIEF DESCRIPTION OF THE DRAWINGS

Embodiments of the present invention will now be described in detail, with reference to the drawings.

DETAILED DESCRIPTION OF THE PREFERRED EMBODIMENTS

Now, the present invention will be explained below in more detail with reference to the accompanying drawings in accordance with the embodiments.

Figure 1:
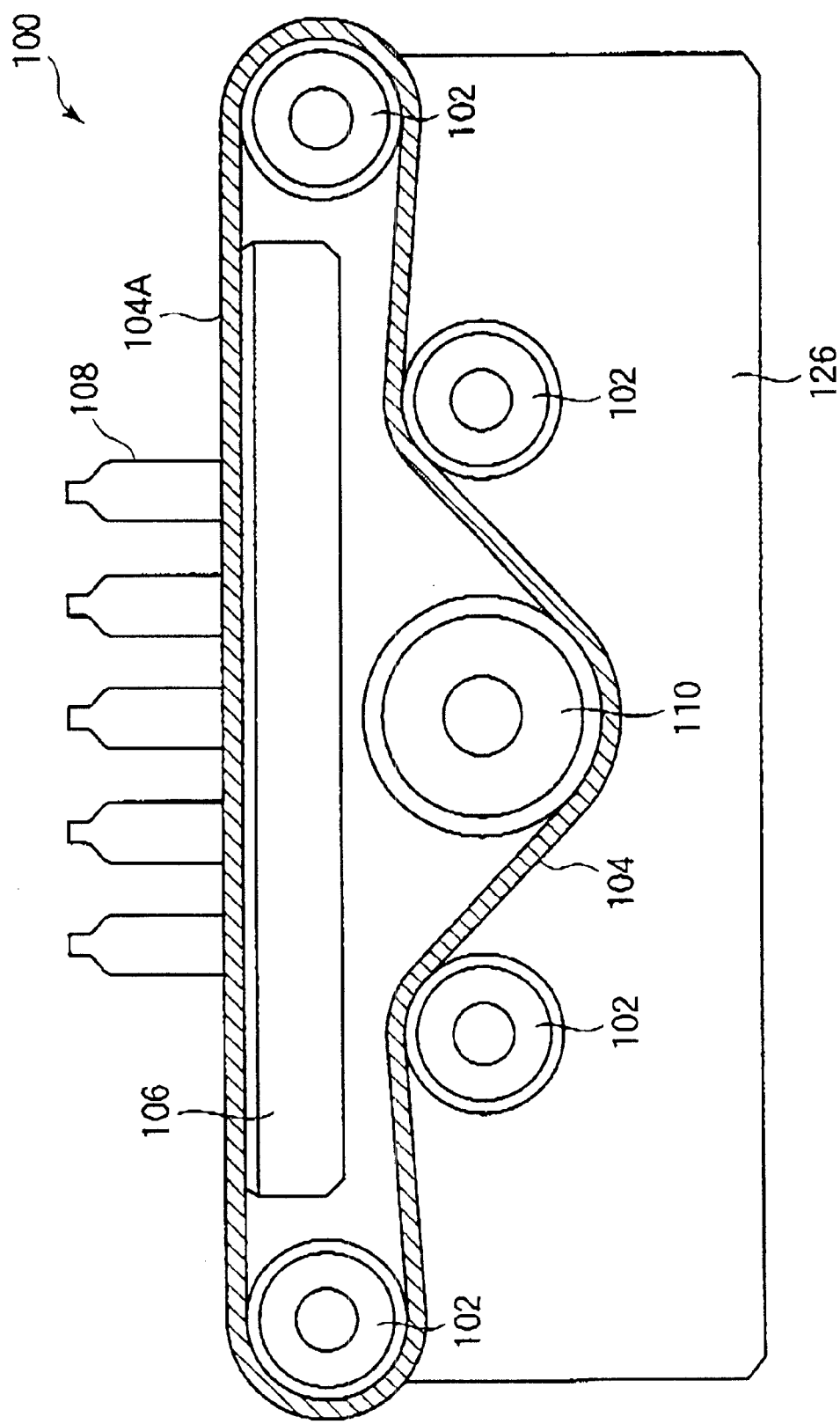
FIG. 1 is a view illustrating a conveyor system incorporating a drive roller assembly according to a first embodiment of the present invention.
Figure 2:
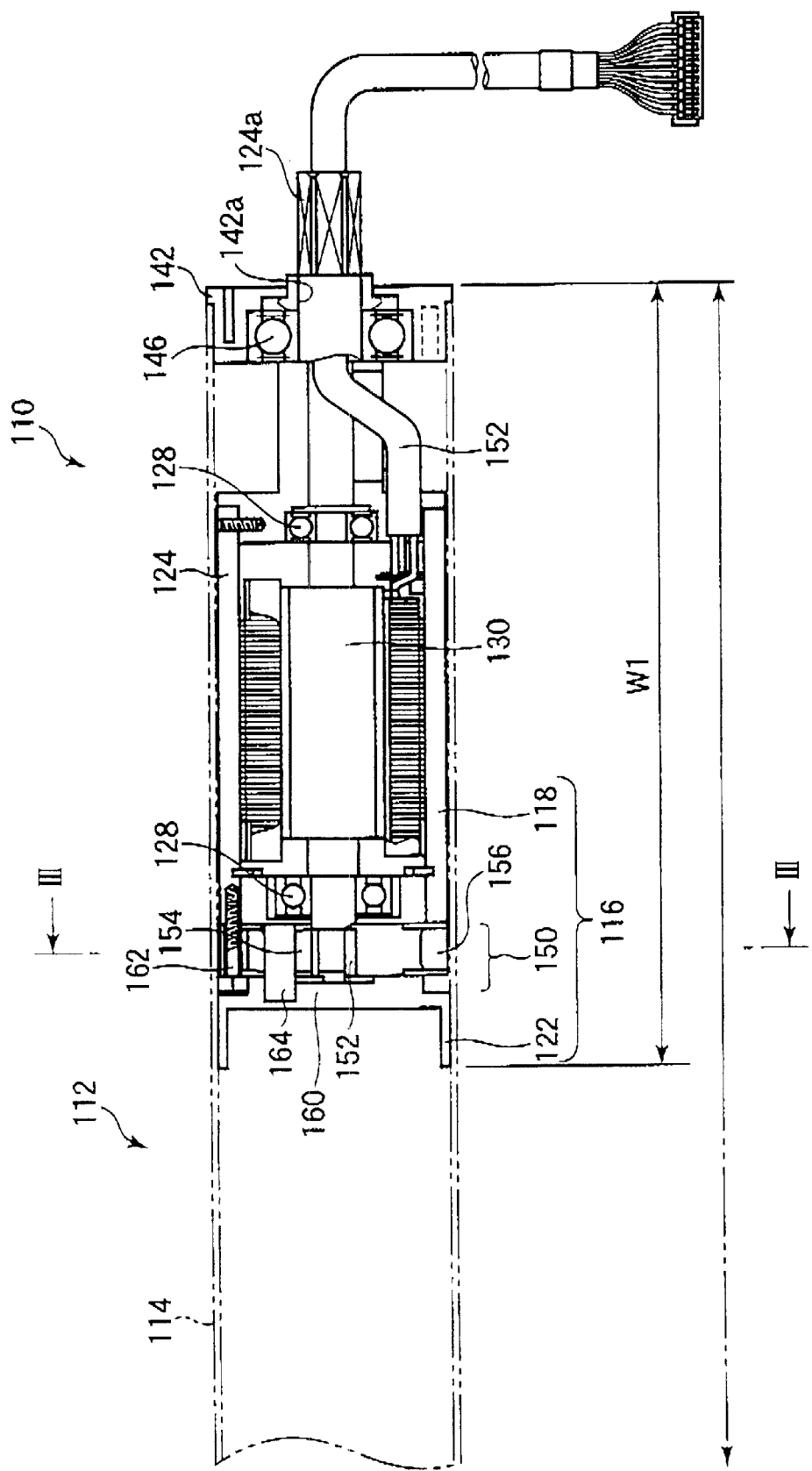
FIG. 2 is a sectional view illustrating the inner structure of the drive roller assembly.
Figure 8:
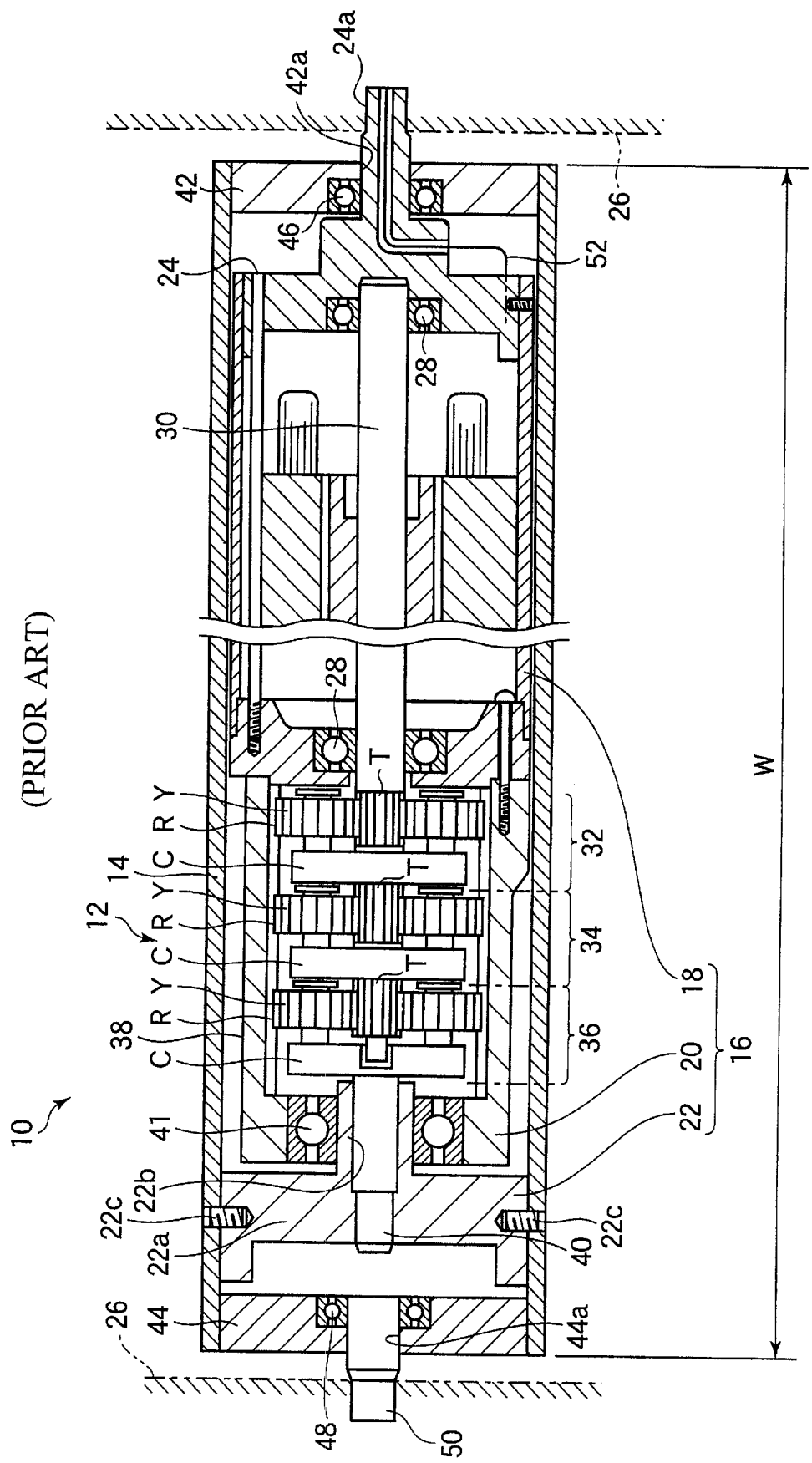
FIG. 8 is a sectional view illustrating a prior-art drive roller assembly.

FIGS. 1 and 2 show the overall configuration of a drive roller assembly 110 according to a first embodiment of the present invention. Incidentally, except for the components to be specifically described below, the drive roller assembly 110 has almost the same structure as that of the prior-art drive roller assembly 10 shown in FIG. 8. Accordingly, the portions or members that are the same as or similar to those of the drive roller assembly 10 are given such reference numerals having the lower two digits that are the same as the reference numerals given to the portions and members of the drive roller assembly 10, and the configuration and action of the portions and members are not explained repeatedly.

The drive roller assembly 110 is used being incorporated as part of a conveyor system 100. The conveyor system 100 includes a plurality of conveyor rollers 102 having no driving function, the aforementioned drive roller assembly 110, a conveyor belt 104 to be wound around those rollers, and a conveyor table 106 for holding a conveyor surface 104a of the conveyor belt 104 from beneath to prevent the deflection of the belt. Here, it is assumed that a plurality of long bottles 108 are placed upright as conveyed goods. Incidentally, each of the conveyor rollers 102 and the drive roller assembly 110 are provided on an external frame 126.

As shown in FIG. 2, the drive roller assembly 110 includes a conveyor roller 112 and a conveyor roller drive device 116. The conveyor roller drive device 116 includes a motor 118 (a type of a power generator) for generating rotational power and a coupling portion 122, coupled to a barrel portion 114 of the conveyor roller 112, for transmitting the rotational power of the motor 118 to the conveyor roller 112.

Figure 3:
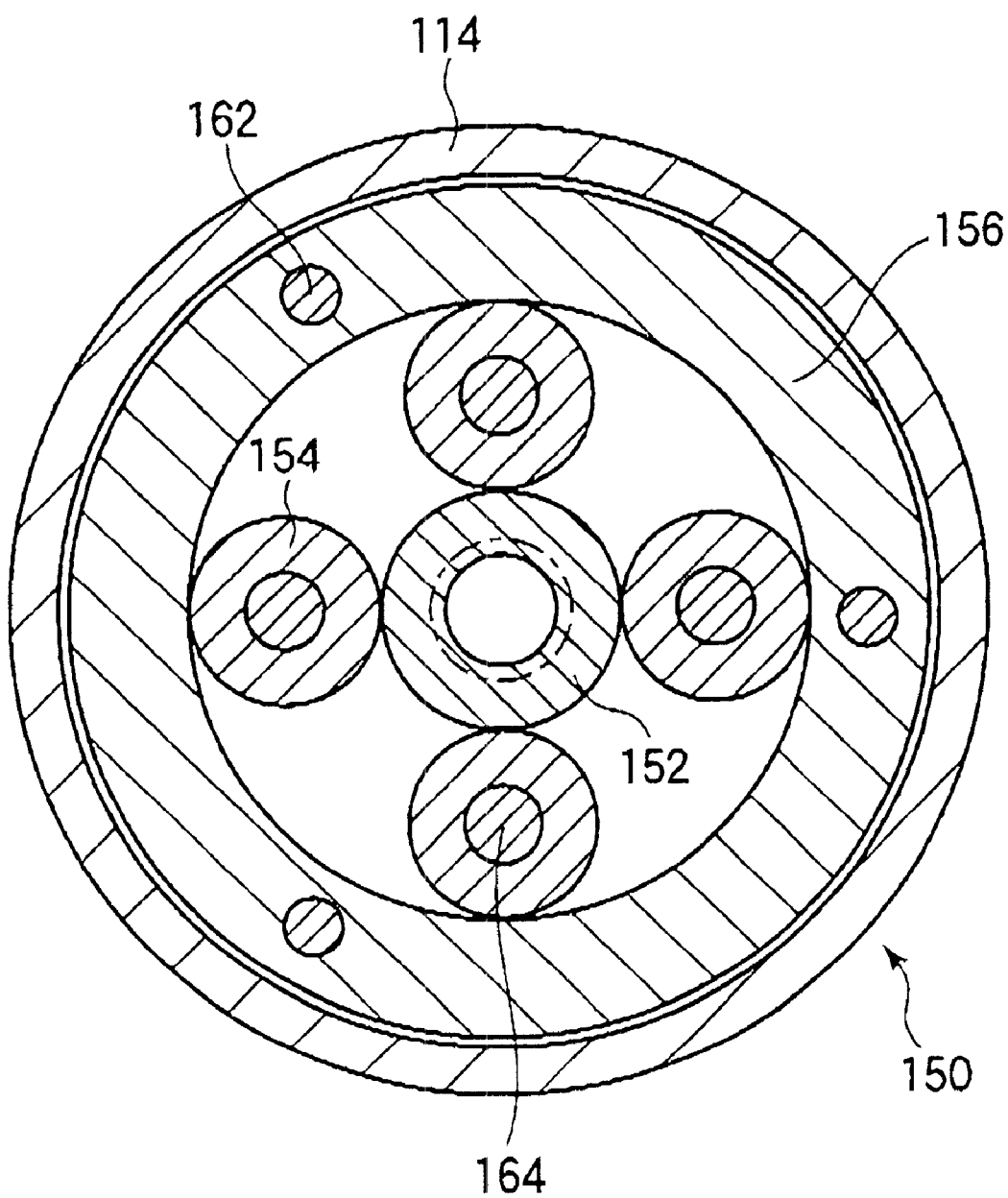
FIG. 3 is a cross-sectional view taken along line III—III of FIG. 2.

Furthermore, a traction roller transmission mechanism 150 is interposed in the rotational power transmitting path between the motor 118 and the coupling portion 122. As shown in FIG. 3, the traction roller transmission mechanism 150 includes a sun roller 152, planetary rollers 154 arranged on and rolling in contact with the periphery of the sun roller 152, a ring roller 156 for allowing the planetary rollers 154 to roll in contact with the inner periphery surface thereof, and a carrier 160 being in phase with the revolution component of the planetary rollers 154.

The sun roller 152 is provided on a motor shaft 130 of the motor 118, rotating in conjunction with the motor shaft 130. The ring roller 156 is bolted with bolts 162 onto a casing 124 of the motor 118. In addition, the planetary roller 154 has a pin 164 inserted at the center thereof, with one end of the pin 164 being fixed to the carrier 160. Accordingly, this arrangement makes the revolution component of the planetary rollers 154 be in phase with the rotation of the carrier 160 via the pins 164.

That is, in this configuration, the sun roller 152 acts as an input element, the ring roller 156 acts as a fixed element, and the carrier 160 acts as an output element, providing a speed reduction function. However, the present invention is not limited thereto. Any combination could be accepted so long as any one of those components is employed as an input element for receiving rotational power, another one is employed as an output element for outputting rotational power, and the remaining one is employed as a fixed element.

Furthermore, in this embodiment, the coupling portion 122 for transmitting power to the barrel portion 114 is integrated with the carrier 160. That is, it is also conceivable that the traction roller transmission mechanism 150 is provided on the coupling portion 122. Consequently, the traction roller transmission mechanism 150 itself, having a power transmission function, acts as a bearing to support the output side of the motor 118 (the front side: an end portion of the motor shaft 130). The motor 118 is supported at the rear side thereof by means of the external member (frame) 126 via a support shaft 124a projecting on the casing 124, thereby allowing the motor 118 to be supported at both the ends. Incidentally, in this embodiment, the coupling portion 122 and the carrier 160 are formed of one member. However, it is sufficient only if the both are coupled to each other, and thus the both may be formed of a separate member.

As a result of the aforementioned configuration, the conveyor roller drive device 116 is housed inside the barrel portion 114 of the conveyor roller 112, and the conveyor roller 112 functions as a motor roller.

Suppose that the rated torque of the motor 118 is converted by the traction roller transmission mechanism 150 and then transmitted to the conveyor roller 112 (during the steady operation of the conveyor). In this case, the drive roller assembly 110 is preferably set so that the sliding ratio of the traction roller transmission mechanism 150 is 0.1% or more and 1.0% or less. This setting can be realized by adjusting the fastening allowance of the sun roller 152, the planetary rollers 154, and the ring roller 156 or by changing the type of lubricant (often referred to as traction oil) or the axial width of each traction roller. Setting the sliding ratio over than 1.0% would cause an increase in cushioning function, but a shift to the steady operation tends to be more delayed. Setting the ratio less than 0.1% would cause over-quality and an increase in surface pressure to possibly result in reducing the product life.

Furthermore, in the drive roller assembly 110, the load torque of the conveyor system 100 during steady operation is converted into a value T in terms of the output element (the carrier 160 in this case) of the traction roller transmission mechanism 150. The limit transmission torque P inherent to the traction roller transmission mechanism 150 is set such that P>1.0×T. Incidentally, the limit transmission torque is a value obtained by converting, in terms of the side of the carrier 160, the maximum torque that can be transmitted by the traction roller transmission mechanism 150. On the other hand, the relationship between the output element converted value T and the limit transmission torque P of the traction roller transmission mechanism satisfies that P>2.3×T to make the sliding ratio about 0.2% or less and that P>4.0×T to make the sliding ratio 0.1% or less. In practice, as already mentioned, it is not practical to employ a sliding ratio less than 0.1% but preferable to satisfy that 4.0×T>P>1.0×T.

Now, the action of the conveyor system 100 and the conveyor roller drive device 116 provided therein is described below.

The conveyor roller drive device 116 (hereinafter referred to as the drive device) has the traction roller transmission mechanism 150 disposed in the power transmission path. Consequently, the traction roller transmission mechanism 150 allows the "sliding" thereof to function as a cushion in transmission of torque. For example, a sudden rise in start-up torque is absorbed by the sliding upon transmitting the start-up torque of the motor 118 to the conveyor rollers, thereby making it possible to prevent the bottles 108 from falling down. This holds true not only at the time of start-up but also at the time of a sudden acceleration or deceleration. In particular, this is specially effective for the high efficiency motor which has been lately achieving widespread use and possibly has a start-up torque about four times as great as the rated torque.

More specifically, the drive device 116 allows the traction roller transmission mechanism 150 to slide to act as a "cushion", thereby providing an increase in the rotational speed of the conveyor roller 112 slightly behind an increase in that of the motor 118. Consequently, it is made possible to provide a smooth acceleration property (a cushioning start-up function) not by means of a speed controller but mechanically.

In addition, suppose that an external impact is exerted upon the conveyor belt 104 of the drive roller assembly 110, thereby causing a variation in the external load of the conveyor roller 112. In this case, the load torque is prevented from being directly transmitted to the motor 118. This is also because the traction roller transmission mechanism 150 functions as a cushion in the transmission of torque. More specifically, a sudden increase in load torque would cause an increase in the "sliding" of the traction roller transmission mechanism 150, which is in turn acts as a cushion. Consequently, this causes a drop in rotational speed of the conveyor roller 112 to be indirectly transmitted including the (increased) amount of sliding, Accordingly, a sudden variation in torque caused by a forced sudden deceleration of the motor 118 is prevented, thus making it possible to shift to (or restore) the stable state again comparatively smoothly.

As is obvious from the foregoing, a variation in torque is alleviated which acts between the motor 118 and conveyor roller 112, thereby reducing the vibration to be transmitted to the external frame 126 to which the motor 118 is fixed. Consequently, the burden of the support shaft 124a of the motor 118 can be alleviated, and the rigidity of the external frame 126 (to prevent vibrations) needs not to be unnecessarily increased.

In addition, the sliding ratio of the traction roller transmission mechanism 150 has been set to 0.1% or more and 1.0% or less. Thus, in the case of the steady operation of the motor 118, the delay in speed of the conveyor roller 112 falls within the aforementioned range. Furthermore, the limit transmission torque P of the traction roller transmission mechanism 150 is so set as to satisfy that P>1.0×T, with respect to the converted value T of the carrier 160 corresponding to the load torque of the conveyor system 100 in the steady operation. Thus, it is made possible to further stabilize the conveying performance of the conveyor system 100.

Consideration of the overall drive roller assembly 110 shows that the traction roller transmission mechanism 150 is adapted to have each of the rollers 152, 154, 156 rolling in contact therewith and function as a "bearing". Accordingly, although a special-purpose bearing has not been provided, the front side of the motor 118 is supported by the traction roller transmission mechanism 150. Thus, the motor 118 is supported at the both ends or by a so-called "both-end support structure" in conjunction with the support shaft 124a provided on the rear side. Consequently, the drive device 116 is simplified in structure and thereby reduced in weight. In addition, the possible minimum size W1 can be reduced in the axial size W of the conveyor roller 112 in comparison with that of the prior art. Consequently, it is made possible to flexibly vary the length of the conveyor roller 112 in a wider range as required.

Incidentally, the first embodiment has shown such an example in which only one traction roller transmission mechanism 150 is disposed in the power transmission path. However, the present invention is not limited thereto, and another accelerator or decelerator or the like may be incorporated at the pre-stage or post-stage (or at both stages) of the traction roller transmission mechanism 150.

Figure 4:
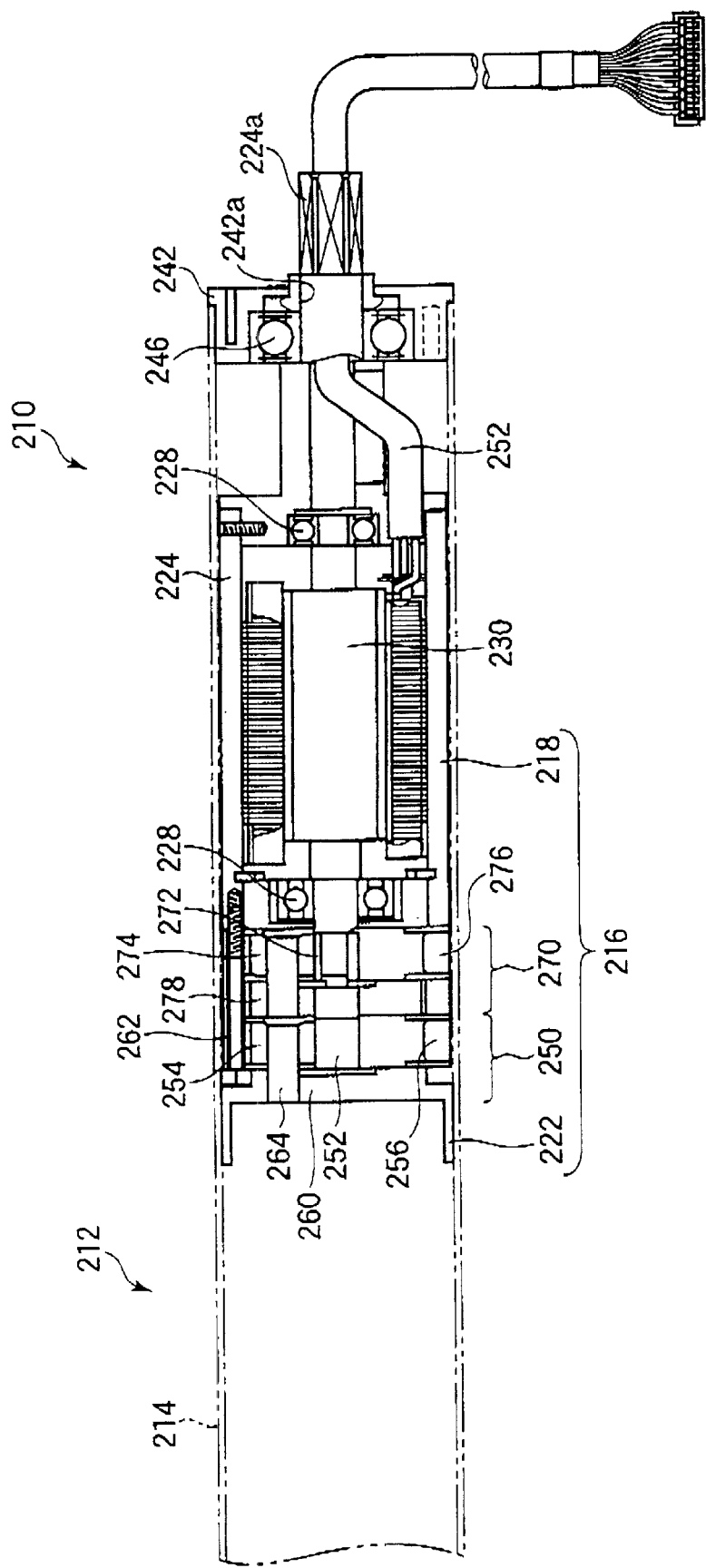
FIG. 4 is a view illustrating a drive roller assembly according to a second embodiment of the present invention.

For example, like a drive roller assembly 210 shown in FIG. 4 according to a second embodiment, a second traction roller transmission mechanism 270 having a configuration similar to a first traction roller transmission mechanism 250 may be further installed at the pre-stage of the first traction roller transmission mechanism 250 having a coupling portion 222 coupled with a carrier 260. In addition, although not illustrated, at the pre-stage or post-stage of the traction roller transmission mechanism, an orthogonal type of gear mechanism (such as a bevel gear set or a hypoid gear set) may be provided, and a simple planetary gear mechanism may be further provided.

The second traction roller transmission mechanism 270 includes a sun roller 272 to be coupled to a motor shaft 230 of a motor 218, planetary rollers 274 to be arranged on the periphery thereof, a ring roller 276 to be fixed to a casing 224, and a carrier 278 which rotates in phase with the revolution component of the planetary rollers 274 and is coupled to a sun roller 252 of the first traction roller transmission mechanism 250. Incidentally, other configuration or the like is the same as that of the drive roller assembly 110 according to the first embodiment. Thus, the same portions are given reference numerals having the lower two digits which are the same as the reference numerals of the drive roller assembly 110, and will not be described again.

As a matter of course, it is possible to provide a greater deceleration ratio by such a two-stage or more-stage combination. In particular, this allows the carrier 278 itself to be supported between the first and second traction roller transmission mechanisms 250 and 270 which serve also as a bearing, thereby reducing noise dramatically. Incidentally, suppose that the both are formed of a planetary gear reducer. In this case, a mating clearance (including backlash) is produced in each gear, thereby causing the carrier or the like to vibrate vigorously to provide increased noise.

Figure 5:
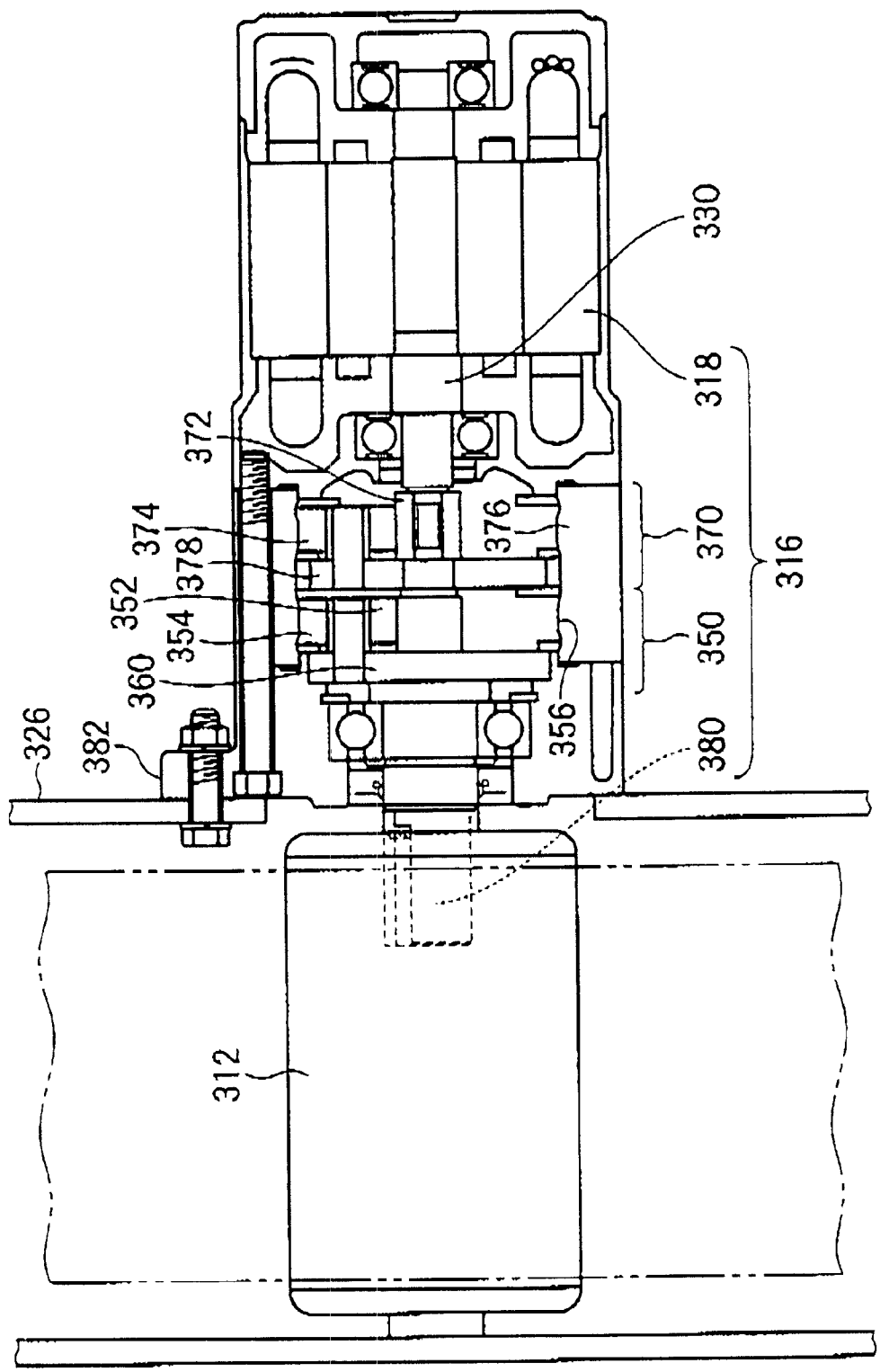
FIG. 5 is a sectional view illustrating a conveyor roller drive device according to a third embodiment of the present invention.

On the other hand, the aforementioned first and second embodiments have shown such an example in which a drive device is housed in a conveyor roller, however, the present invention is not limited thereto. As an example, FIG. 5 shows a conveyor roller drive device 316 according to a third embodiment.

The drive device 316 is generally the same in structure as a drive device 216 according to the second embodiment but is greatly different in that the drive device 316 is provided separately outside conveyor rollers 312. Incidentally, the members which are the same in structure as those of the second embodiment are given reference numerals having the lower two digits which are the same as the reference numerals of the drive device 216, and will not be described individually again.

First and second traction roller transmission mechanisms 350 and 370, provided on a motor 318, decelerate and then output the rotational power of the motor 318. A coupling portion 380 is integrally provided to a carrier 360 in the first traction roller transmission mechanism 350 or a post-stage, and the coupling portion 380 is coupled to the conveyor rollers 312. That is, the first and second traction roller transmission mechanisms 350 and 370 are disposed in the power transmission path from the motor 318 to the coupling portion 380. Incidentally, a ring roller 356 of the first traction roller transmission mechanism 350 is provided with a flange 382 for fixing the drive device 316 to an external frame 326.

Figure 6:
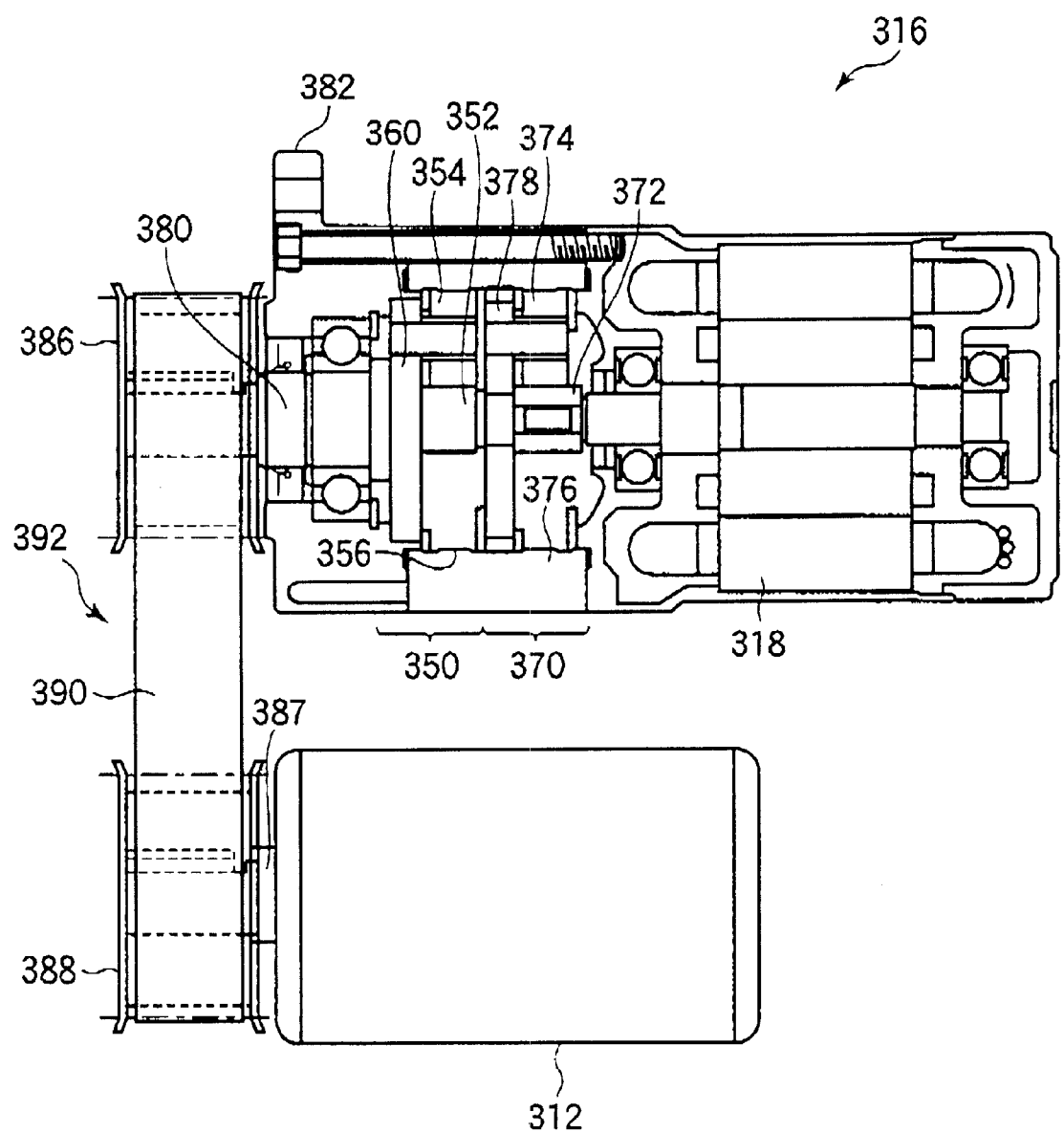
FIG. 6 is a view illustrating another example of the drive device.
Figure 7:
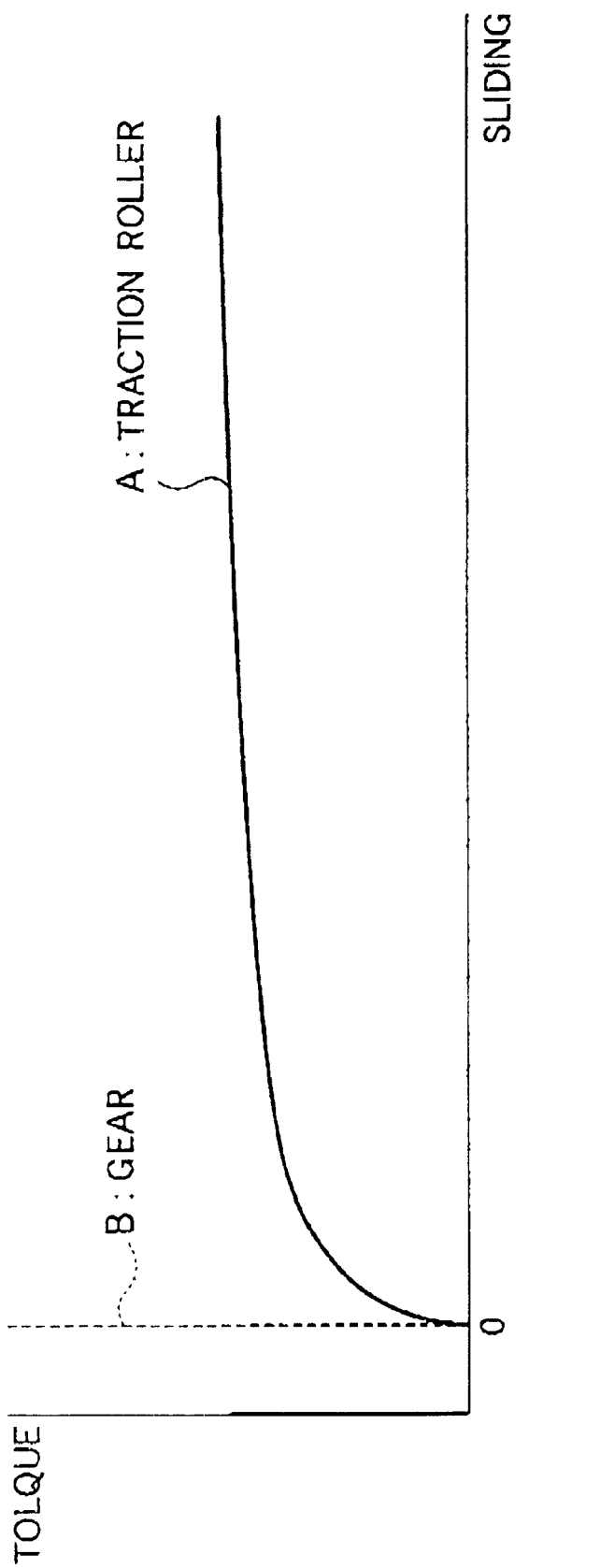
FIG. 7 is an explanatory schematic plot showing the characteristic of a traction roller transmission mechanism according to the present invention.

In addition, as shown in FIG. 6, the drive device 316 may be further provided with a belt transmission mechanism 392. The belt transmission mechanism 392 includes a first pulley 386 to be coupled to the coupling portion 380, a second pulley 388 coupled to a second coupling portion 387 fixed to the conveyor roller 312, and a timing belt 390 wound around the first and second pulleys 386 and 388.

In this case, the belt transmission mechanism 392 exists in addition to the first and second traction roller transmission mechanisms 350 and 370 in the power transmission path from the motor 318 to the second coupling portion 387. (The "coupling portion" referred to herein designates a portion to be coupled to the conveyor roller, and the second coupling portion 387 corresponds to the "coupling portion" of the present invention.)

The drive device 316 can also provide generally the same effect as that of the drive roller assemblies 210 and 310 shown in the first and second embodiments (except for the inherent actions of the motor roller).

Incidentally, in the aforementioned embodiments, the cushioning action of the traction roller transmission mechanism makes it possible to provide stable conveyance without employing a speed controller such as an inverter. However, the inverter or the like may also be used at the same time.

Furthermore, although the first to third embodiments have been shown herein, such a modified embodiment would also be able to exist, in which some portions of the embodiments are combined with each other, so long as the modifications do not depart from the scope of the present invention. In addition, various modified embodiments other than the embodiments shown herein would also exist. Incidentally, the functions and shapes of the members appearing herein are exemplified only for illustration purposes, and the present invention is not limited thereto.

According to the present invention, it is made possible to convey the conveyed goods stably on the conveyor system by mechanical action.

What is claimed is:

1. A conveyor roller having a wet type drive device comprising:

a power generator for generating rotational power, and a coupling portion, coupled to a conveyor roller of a conveyor system, for transmitting the rotational power of said power generator to said conveyor roller as a traction force, wherein a traction roller transmission mechanism is disposed in a rotational power transmission path between said power generator and said coupling portion, said traction roller transmission mechanism comprising a sun roller, planetary rollers disposed on a periphery of said sun roller to roll in contact with said sun roller, and a ring roller for allowing said planetary rollers to roll in contact with an inner periphery surface of the ring roller, wherein the rotational power of said power generator is transferred to said conveyor roller by a lubricant oil provided between relatively moving components of said traction roller transmission mechanism, wherein the rotational power of the power generator being transferred to the conveyor is initially reduced.

2. The conveyor roller drive device according to claim 1, wherein a sliding ratio of said traction roller transmission mechanism is set to 0.1% or more and 1.0% or less when a rated torque of said power generator is transmitted to said conveyor roller.

3. The conveyor roller drive device according to claim 1, wherein a limit transmission torque P of said traction roller transmission mechanism is set so as to satisfy that 4.0×T>P>1.0×T, with respect to an output element converted value T of said traction roller transmission mechanism corresponding to a load torque provided during steady operation of said conveyor system.

4. The conveyor roller drive device according to claim 1, wherein said traction roller transmission mechanism has a carrier being in phase with the revolution component of said planetary rollers.

5. The conveyor roller drive device according to claim 4, wherein any one of said sun roller, said carrier, and said ring roller is employed as an input element for receiving rotational power, another one is employed as an output element for outputting rotational power, and the remaining one is employed as a fixed element.

6. A drive roller assembly comprising the conveyor roller drive device according to claim 1, and said conveyor rollers to be driven by said conveyor roller drive device, wherein a motor is employed as said power generator, and said motor, said traction roller transmission mechanism, and said coupling portion are housed inside a barrel portion of said conveyor roller, so that said conveyor roller functions as a motor roller.

7. The drive roller assembly according to claim 6, wherein an output element of said traction roller transmission mechanism is fixed to said coupling portion, and a fixed element of said traction roller transmission mechanism is fixed to a casing of said motor so as to allow said traction roller transmission mechanism to support an output side of said motor.

* * * * *